US006678582B2

(12) United States Patent
Waled

(10) Patent No.: US 6,678,582 B2
(45) Date of Patent: Jan. 13, 2004

(54) METHOD AND CONTROL DEVICE FOR AVOIDING COLLISIONS BETWEEN COOPERATING ROBOTS

(75) Inventor: El-Houssaine Waled, Windsor (CA)

(73) Assignee: Kuka Roboter GmbH, Augsburg (DE)

(*) Notice: Subject to any disclaimer, the term of this patent is extended or adjusted under 35 U.S.C. 154(b) by 0 days.

(21) Appl. No.: 10/159,701

(22) Filed: May 30, 2002

(65) Prior Publication Data

US 2003/0225479 A1 Dec. 4, 2003

(51) Int. Cl.$^7$ ............................................. G06F 19/00
(52) U.S. Cl. .................. 700/245; 700/247; 700/251; 700/254; 700/258; 700/259; 700/260; 700/262; 318/568.11; 318/568.12; 318/568.24; 318/580; 318/587; 318/646; 318/648; 701/50; 701/211; 701/212; 701/213; 701/214; 701/215; 701/301; 901/1; 901/9; 901/15; 901/14
(58) Field of Search .................. 700/245, 251, 700/262, 263, 260, 254, 259, 247, 258; 318/568.11, 568.24, 646, 648, 560, 632, 580, 587, 568.12; 701/50, 211, 207, 212, 200, 208, 23, 213, 217, 221, 301, 214, 215; 901/1, 9, 15, 14

(56) References Cited

U.S. PATENT DOCUMENTS

| 4,663,726 A | * | 5/1987 | Chand et al. | 700/252 |
| 4,925,312 A | * | 5/1990 | Onaga et al. | 700/261 |
| 4,999,553 A | * | 3/1991 | Seraji | 700/245 |
| 5,430,643 A | * | 7/1995 | Seraji | 700/263 |
| 5,737,500 A | * | 4/1998 | Seraji et al. | 700/251 |
| 5,908,458 A | * | 6/1999 | Rowe et al. | 701/50 |
| 6,058,344 A | * | 5/2000 | Rowe et al. | 701/50 |
| 6,070,109 A | * | 5/2000 | McGee et al. | 700/259 |
| 6,317,651 B1 | * | 11/2001 | Gerstenberger et al. | 700/245 |

FOREIGN PATENT DOCUMENTS

| DE | 40 01 493 | 7/1991 |
| DE | 41 11 354 | 10/1992 |
| DE | 195 17 771 | 11/1996 |
| DE | 198 10 341 | 9/1999 |
| DE | 198 57 436 | 6/2000 |
| EP | 0 412 619 | 2/1991 |
| EP | 0 582 715 | 2/1994 |

OTHER PUBLICATIONS

Thrum et al., Probabilistic Algorithms and the Interactive Museum Tour–Guide Robot Minerva, 2000, Internet, pp. 1–35.*

Ogren et al., A provably convergent dynamic window approach to obstacle avoidance, 2001, Internet, pp. 1–6.*

Fox et al., Controlling synchro–drive robots with teh dynamic window approach to collision avoidance, 1996, IEEE, pp. 1280–1287.*

(List continued on next page.)

Primary Examiner—William A. Cuchlinski, Jr.
Assistant Examiner—McDieunel Marc
(74) Attorney, Agent, or Firm—McGlew and Tuttle, P.C.

(57) ABSTRACT

A method of avoiding collisions between a robot and at least one other object such as another robot is provided in which the user does not need to make any provisions in a robot program for avoiding collisions and defining common work-areas. Furthermore, the method allows for automatic configuration of the workcell from a collision avoidance standpoint. It determines automatically which components have potential collisions with which other components. Since the inventive method is based on predicting the configurations of the moving components over a period of time sufficient enough to allow the machines to stop safely and checks for interference, a priori knowledge of trajectories is not required. If a collision is predicted the machines are commanded to a stop on or off their paths. In this way the inventive collision avoidance method can also be used as a safeguard with other explicit methods.

30 Claims, 6 Drawing Sheets

OTHER PUBLICATIONS

Lee et al., A practical collision–free trajectory planning for two robot systems, 1995, IEEE, pp. 2439–2444.*

Maxwell et al., Alfred: The robot waiter who remembers you, 1999, Internet, pp. 1–12.*

Zilberstein, Using anytime algorithms in intelligent systems, 1996, Internet, pp. 73–83.*

Hristu–Varsakelis et al., Experimenting with hybrid control, 2002, IEEE, pp. 82–95.*

E. Freund and U. Borgolte, 1990, Ein Algorithmus zur Kollisionserkennung und –vermeidung bei Robotern mit zylinderförmigem Arbeitsraum, Robotersysteme.

Jih–Gau Juang, 1998, Collision avoidance using potential fields, Industrial Robot vol. 25, No. 6, 1998, pp. 408–415.

E. Freund and H. Hoyer, 1986, Pathfinding in Multi–Robot Systems: Solution and Applications, CH2282–2/86/0000/013801.00.

* cited by examiner

METHOD AND CONTROL DEVICE FOR AVOIDING COLLISIONS BETWEEN COOPERATING ROBOTS

FIELD OF THE INVENTION

The present invention relates to a method of avoiding collisions between a robot and at least one other object, and to a control device for avoiding collisions between a robot and one or several other objects suited for implementation of the inventive collision avoidance method.

BACKGROUND OF THE INVENTION

According to a general definition two objects A and B are in collision if they share the same space at the same time. That is, there is at least one point in A and one point in B that have the same coordinates with respect to a common frame of reference.

Robots and other objects between which collisions are to be avoided are generally referred to as cooperative mechanisms, since they cooperate in a certain industrial process. The cooperation can be either active (in the case of one robot cooperation with another robot as an example of a cooperative mechanism) or passive. With modern industrial robots moving at considerable velocities, collisions can result in serious damage to both the robots and the work pieces handled by them and may lead to costly production downtimes. Therefore, such collisions must by all means be avoided if an efficient use of industrial robots is to be realized.

Several types of collisions can occur in a working area, i.e. in a workcell shared by a robot and other (moveable) objects. There are several factors to take into consideration when classifying collisions, particularly: (i) The type of objects in question, i.e. robots/machines, stationary objects, etc. (ii) The reason for collision, i.e. path changes, sensory data changes, programming errors, etc. (iii) The production phase, i e. does the collision occur at teach time (manual mode), validation time (automatic mode) or during normal production (automatic mode with application—preferably high—speeds).

A passive stationary object is an object that is fixed in the workcell and has a fixed shape. Examples of passive stationary objects are fixed tables, poles, etc. Obviously, these objects are not controlled by any controller. However, a static geometry model can be obtained and stored so that collision could be checked for. A distinction has to be made between the robot body (links) and the load (tools or workpieces). There could be a permanent potential collision between the robot body and an object. The potential for collision between a tool and the object exists as long as the tool is not linked to any frame on the object. Once the link has been established, (the tool is moving relative to a frame on the object) there is no potential collision between the tool and the object, except during manual operation, e.g. teaching phases or in case of programming errors.

An active stationary object is an object that is fixed in the workcell but that has a variable shape. Examples of active stationary objects are fixtures and palettes (varying heights). Usually robot controllers do not control such objects, thus they do not have any knowledge about their states (open/closed, height etc.). This makes it difficult to check for collision with such objects. However, the collision probability could be eliminated by considering the object as a passive stationary object whose volume is the largest volume possibly occupied by the active stationary object. The distinction between robot body and load mentioned above applies here, too.

A moving object is an object whose position (location and orientation) is not fixed in the workcell. An example of a moving object is a box on a conveyor. Checking for and avoiding collision with such an object requires online knowledge about its position. Path changes can be both expected or unexpected. An expected path change is a change that is inherent to the process and is within known boundaries. Such change could be the result of sensory data, for example, which cause the robot to follow different paths from one cycle to the other. An unexpected path change is a change, either small or large, that occurs when the path is supposed to be the same at all times or that exceeds some boundary of an expected change. Changes that occur when the path is supposed to be constant can be the result of drifts, for example. Dramatic changes that are beyond the boundaries of the expected change can be the result of sensor failure or unhandled errors, e.g. an unsecured part on a conveyor, which is placed beyond the normal position area.

Besides that, there are numerous programming errors that can lead to collisions. These collisions can occur at validation or at normal production phases.

Collisions can also happen during teaching or retouching of points because of user errors or unexpected motions. After the points have been taught or retouched collisions can occur during validation because of unexpected behavior or programming errors. Even if the teaching/retouching phases were collision-free, collisions still can occur during normal production because of path changes or programming errors that did not manifest themselves during the earlier phases. This could happen because several unusual conditions are met at the same time.

U.S. Pat. No. 6,212,444 discloses a method concerning interference avoidance of an industrial robot. In that document, the robot manipulator and another cooperative mechanism are prevented from interfering with each other by defining common areas. One mechanism is prevented from entering the common area until the other mechanism has left it. The common work area approach to avoid collision, however, fails if the control software is not properly written, thus leading to a potentially serious collision in case of an above-mentioned programming error.

Other approaches are applied to offline programming where collision-free paths are generated for the machines (robots and other cooperative mechanisms) in the workcell. However, these methods require a priori knowledge of the robot trajectories. Furthermore, the trajectories of all machines in the workcell have to be repetitive, i.e. the trajectories must not be affected by outside sensors or overrides.

Existing robot controllers usually detect a collision after the fact. Using a dynamic model of the machine, a model motor current is determined. If the actual current exceeds the model current beyond a certain threshold, a collision is assumed to have happened and the system is shut down to minimize damage.

SUMMARY OF THE INVENTION

The present invention aims at solving the problem of robot and robot-environment collision avoidance while obviating the above-mentioned disadvantages of the prior art.

To this end, the present invention provides a method of the above-mentioned type, which regularly comprises determining a stopping time for an automatically or manually controlled robot movement on the basis of actual and past joint positions and velocities of each robot joint; forecasting a configuration of a trajectory of the robot at said stopping times; checking the predicted configuration through distance/interference algorithms for interference of robot components with components of said other objects; and stopping the robot and/or said other objects in case a collision is imminent.

In the scope of the invention, said predicted configurations are determined using said stopping times and assuming that the robot continues moving with its present acceleration starting from its present velocity and position. Thus the forecasted trajectories will in general have a speed different form zero. In this context, said configuration is referred to as stopping configuration although it will generally have a speed different form zero.

In order to prevent collisions, configurations are checked for collision not only at the present time, but at a future time that is sufficient for the machines to stop safely prior to any undesired contact.

According to a further development of this method, the robot is stopped on its path. Thus robot operation can be resumed directly from the stopping position without any further position correction or workpiece rejects. Also, stopping the machines on their paths ensures that no collisions will occur while the machines are decelerating to a stop.

In another embodiment of the invention, the robot is stopped off its path. This means that each axis is slowed down from its actual speed to zero following a configurable profile. This can be achieved by short-circuit braking, wherein the motors are decelerated by mechanical brakes and by generator operation. Such a breaking procedure is advisable if a motor cannot be stopped on the path because the ramp is too steep, or for other reasons.

In order to predict or check for collision, one has to be able to determine the distances between the components of the robot and other objects. This involves determining the distance between geometric approximations of the entities involved, which can be either simple shapes such as boxes or spheres or complex polyhedra, i.e. multi-faceted, closed geometric figures. The most widely used method for determining the distance between convex polyhedra is the Gilbert Johnson-Keerthi (GJK) method, which is an iterative method that subdivides the geometry into simplexes until it converges to the minimum distance between the two objects. There is a tradeoff between the accuracy of the approximation and the performance (time of execution) of the collision detection algorithms used in the invention. For example, approximating all the links of a robot by enclosing cylinders, boxes or spheres is rather conservative, but allows for fast execution of the collision detection algorithms. On the other hand, approximating the links by polyhedra, that more accurately approximate the link shape results in less performance of the collision detection algorithms. Therefore, according to a preferred embodiment of the invention, the geometric interference checking involves determining distances between geometric approximations which have different levels of accuracy, which are checked according to a desired accuracy in distance checking. For example, if the enclosing shapes are far away from each other, then there is no need to check the more accurate approximations. Geometry approximation is a challenging and time-consuming task. However, there is already commercial software available, that automatically translates CAD models into geometry files that can be used with the collision detection algorithms. Collision avoidance involves accurate specification of the trajectories. Since the motion profiles of industrial robots are sufficiently smooth, relatively simple configuration prediction algorithms can be used to predict the trajectories. From the actual position and actual velocity of each joint i at present and past times, one can forecast the joint trajectory in terms of a future joint position as follows:

$$\theta_i = 1/2\gamma_i t_{i,s}^2 + \dot{\theta}_{i,0} t_{i,s} + \theta_{i,0} \quad (1)$$

where $\theta_{i,0}$ and $\dot{\theta}_{i,0}$ are the joint position and velocity at the current time t, respectively; $\gamma_i$ is the estimated joint acceleration at t and $t_{i,s}$ the stopping time. The joint acceleration can be estimated from the joint velocity at time t and earlier times $t_{-k}$, $t_{-k} = t - k \cdot \Delta t (k=1, 2, 3, \ldots)$, where $\Delta t$ is the checking time interval, which may be equal to the sampling period of the robot controller and can take on values around 12 ms. The joint position $\theta$ and the joint velocity $\dot{\theta}$ are given as an angular position (deg) and an angular velocity (deg/s), respectively.

According to a preferred embodiment of the invention the velocity $\dot{\theta}_i$ of joint i is estimated from the joint position $\theta_{i,0}$ at current time t and at earlier times $t_{-k}$ using Gear's method, i.e.:

$$\dot{\theta}_i = c_f \cdot \sum_{k=0}^{4} c_k \cdot \theta_{i,-k} \quad (2)$$

where $\theta_{i,-k} = \theta_i(t_{-k})$, and $c_f = 1/(12 \, \Delta t)$, $c_0 = 25$, $c_1 = -48$, $c_2 = 36$, $c_3 = -16$, $c_4 = 3$.

Similarly, the acceleration $\gamma_i$ of joint i is estimated from the joint velocity $\dot{\theta}_i$ at current time t and at earlier times $t_{-k}$, $t_{-k} = t - k \cdot \Delta t$, using:

$$\gamma_i = c_f \cdot \sum_{k=0}^{4} c_k \cdot \dot{\theta}_{i,-k} \quad (3)$$

An investigation has been conducted to test the accuracy of the prediction, which has been found sufficient for prediction times up to 240 ms for typical robot applications.

According to another embodiment of the invention, configuration forecasting and interference checking involves: determining a stopping distance of joint i from $$\theta_{i,stop} = \frac{\dot{\theta}_0^2}{(2\gamma_{i,max})},$$

where $\gamma_{i,max}$, is a maximum negative acceleration of the joint; adding the stopping distance $\theta_{i,stop}$ to the actual position to obtain a configuration over the stopping time; and determining a distance between robot components and said other object at said configuration. This is a rather conservative approach: For example, the maximum velocity and maximum deceleration of the first joint of a robot could be 240 deg/s and 880 deg/s², respectively. Therefore, the joint's stopping angle from full speed is approximately 33 deg. Thus, due to the large stopping distance a collision could be predicted at the stopping configuration even though the planned trajectory is actually collision-free.

In order to enhance the accuracy of position prediction, according to a further development of the inventive method a filter is applied to the joint position and velocity data used for position prediction. Preferably, the filter is applied to the data in the time domain. In a preferred embodiment of the invention the filter is devised as a running average which efficiently smooths the data and thus filters predominantly the high frequency components which are present especially during abrupt directional changes of the robot movement (jerks). Filter length can be adapted to the desired prediction accuracy or the irregularity of the motion profile. Alternatively, filtering can also be done in the frequency domain.

The stopping time of a robot axis depends on the following parameters:

axis velocity: The higher the speed the more time is needed to stop the robot.

maximum allowed deceleration: The higher the maximum allowed deceleration, the less time is needed to stop the robot.

configuration of the robot: Since the inertia of the robot is configuration dependent, the stopping time of a given axis depends on the values of the remaining axes, in particular the axes down the kinematic chain, i.e. towards the distal end of the robot.

payload: The heavier the load and the higher its inertia, the more time is needed to stop the robot.

The stopping time can be estimated from a lookup table. However, given the number of parameters upon which the stopping time of an axis depends the invention provides a mechanism that has been devised to estimate the axes stopping times in a manner that is suitable for real-time applications. Thus, to further enhance both the accuracy and the speed of stopping time estimation and in order to make this estimate more flexible and more adapted to a particular situation, according to a further development of the invention configuration forecasting and interference checking involves using at least one neural network to estimate stopping times of the robot axes. In a preferred embodiment one neural network is used for each robot joint.

In this scope, the method according to the invention uses multilayer, back propagation neural networks (NN). The NNs take as inputs the parameters that influence the axis' stopping time, and produces an estimation of the axis' stopping time. The NNs are trained with data measured from the robot. The training data set should cover the whole working space of the parameters including one or more elements from a group comprising joint velocities, joint angles, joint positions, robot base positions, robot base velocities and tool or load masses. Once the NNs are trained they can be used to accurately estimate the stopping times.

U.S. Pat. No. 6,356,806 B1/DE 198 57 436 A1 discloses the use of a combination of a standard PC operating system and a real time operating system for robot control. The robot and workpiece geometry are approximated in an external CAD or offline simulation system and the resulting output file is stored in conjunction with the standard PC operating system of the robot controller. In order to make the geometry file, which is usually created and maintained in conjunction with the PC operating system, accessible for tasks running under the real-time operating system when using the method according to the invention with this dual type of robot control unit, all acquired information concerning collisions is preferably stored in a workcell description file for communication to a real-time operating system responsible for controlling the robot movement.

In a further development of the inventive method, the work cell description file contains pointers to geometric approximation files needed to describe all objects present in the workcell. According to another embodiment of the inventive method, a copy of the workcell description file is maintained and updated on each controller, i.e. on each cooperative mechanism present in the workcell. Furthermore, the workcell description file can be updated at least when a geometric change happens in the workcell, e.g. mounting of a new tool to the robot. This can also happen in the real-time operating system.

Most robotic applications require some form of allowed and controlled contact, e.g. material handling, welding, etc. Therefore, the controller must know that these contacts are not to be treated as dangerous collisions leading to a stop of the robot motion. To this end, prior to an allowed contact between the robot and an object, e.g. during a handling operation a link is established causing the robot and, where applicable, the object not to stop during a subsequent "collision". This link can be broken after the allowed contact operation is terminated.

In this context it is important to distinguish between situations where all machines present in a workcell are moving along known, predefined trajectories and situations, where the machines' trajectories are modified at real time, e.g. based on sensory information (cameras etc.). Here the former shall be called synchronous situations while the latter are referred to as asynchronous situations. Such situations also exist in the relationship between, for instance, a robot and a tool used by the robot. A component of the workcell is linked to another component if the former is moving in a frame fixed on the latter. In this case, the relative motion between the two components is synchronous and there is no potential collision between them while the link is established, i.e. movement of one component, for instance a first robot, will cause a corresponding movement of the other component, e.g. a second robot. Thus the relationship between the two is kept constant. A potential for collision might exist before the link is established or after the link has been broken. A tool that comes in contact with a workpiece is linked to that workpiece. Therefore, it is then moving relative to a frame fixed on the workpiece. The operation is then synchronous and there is no potential of collision between the tool and the workpiece. The asynchronous cases can represent up to 90% of the cases in factory use of industrial robots.

In order to use the above-described method with a robot for avoiding collision between the robot and at least one other object, the invention further provides a control device comprising means for regularly determining a stopping time for an automatically or manually controlled robot movement on the basis of actual and past joint positions and velocities of each robot joint; means for regularly forecasting a configuration of a trajectory of the robot at said stopping times; means for regularly checking the predicted configuration through distance/interference algorithms for interference of robot components with components of said other objects; and means for stopping the robot and/or said other objects in case a collision is imminent.

The inventive control unit shall be called a Collision Avoidance Manager (CAM). The CAM is a controller that is responsible for detecting and reacting to collisions between at least two components of the workcell. There can be more than one CAM in a workcell.

In another embodiment the control device according to the invention comprises processor means for running two operating systems in parallel, one of which being a standard PC operating system, the other one being a real-time operating system for controlling robot motion; said processor means for running an interpretation program for communication between the PC and the real-time operating systems. In this way, the user is provided with a standard user interface which very much simplifies robot programming. In a preferred embodiment said processor means are devised for running respective parts of a program implementing a collision avoidance method. In a further development the control device according to the invention comprises memory units in conjunction with both operating systems for storing work cell related geometry data.

As was mentioned earlier, all the information about collisions (e.g. potential collisions, pointers to geometry files, etc.) is stored within memory units of the CAM in special workcell description files called WorkCell Diagrams (WCD). For each component of the cell, information about its potential collisions and geometry files is thus stored in the memory units. This information is loaded onto the real-time control, so that the above-described Collision Avoidance Tasks (CAT), i.e. the actual prediction of robot movement and its stopping on or off the path in connection with the inventive method can access it in real-time.

In order to communicate collision information between the two operating systems, the control unit according to the invention provides an interpretation program or interpreter, preferably running under the PC operating system. As a workcell can contain several CAMS in connection with a plurality of collision-monitored robots etc., a further development of the control device according to the invention comprises processor means at least in connection with the real-time operating system, that are designed for communication with real-time operating systems of other corresponding control devices present in the same workcell. The thus defined inter-controller communication task receives data from the appropriate robot controllers (controllers for which a particular CAM is detecting collisions).

Communication between controllers is a requirement for many aspects of cooperation between robots. In this context different data need to be communicated to the CAM for the collision avoidance to work. The CAM needs to know the configuration of components in the workcell. Therefore, for every robot or object that the CAM is monitoring, the following needs to be communicated:

- joint values: These define the configuration of the robot with respect to its base;
- base coordinates: This, in conjunction with the joint values, defines the configuration of the robot in the workcell. Note that the base may be moving if the robot is mounted on a rail, for example;
- joint velocities and base velocities: These are used in the collision prediction algorithms. Note that the base frame velocity is not readily available from the controller and must be either acquired or estimated using data acquired from the external machine that is moving the robot base;
- part changes;
- tool changes;
- target changes; and
- potential collision changes.

Tool and part changes on the robot that is controlled by the CAM are communicated to the real-time portion of the controller through the interpreter.

According to another embodiment of the invention the control unit further comprises an input device for inputting workcell related geometric data. In this way an externally created CAD geometry file can easily be provided to the CAM. The input device can for instance be a disk drive or a network connection device.

From the above description it is evident, that the present invention has several advantages over previous work: The user does not need to make any provisions in a robot program for avoiding collisions, such as programming common work areas. Still the inventive method can be used as a safeguard in conjunction with other explicit methods of prior art.

Furthermore, the inventive method allows for automatic con figuration of the workcell from a collision avoidance standpoint. It determines automatically which components have potential collisions with which other components.

Since the inventive method is based on predicting the con figurations of the moving components over a period of time which is sufficiently long to allow the machines to stop safely and then checks for interference, a priori knowledge of trajectories is not required. If a collision is predicted the machines are commanded to stop on or off their paths.

Since especially the teach and validation phases are inherently low speed, the stopping times and distances are very short. Thus the inventive method works particularly well in these cases. Collisions that are caused by programming errors or unexpected large path changes lead to a contact between objects that should—under normal conditions—always be far apart from each other. In this case, predicting a planned or stopping configuration may actually be too elaborate and might not be necessary. It then suffices to monitor the distance between the respective objects and to command them to stop if they ever approach one another to within a certain predetermined distance. This simplified approach works for any phase and any speed of movement provided that the distance threshold can be chosen large enough. If not, the more precise approach according to the above specification has to be adopted.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
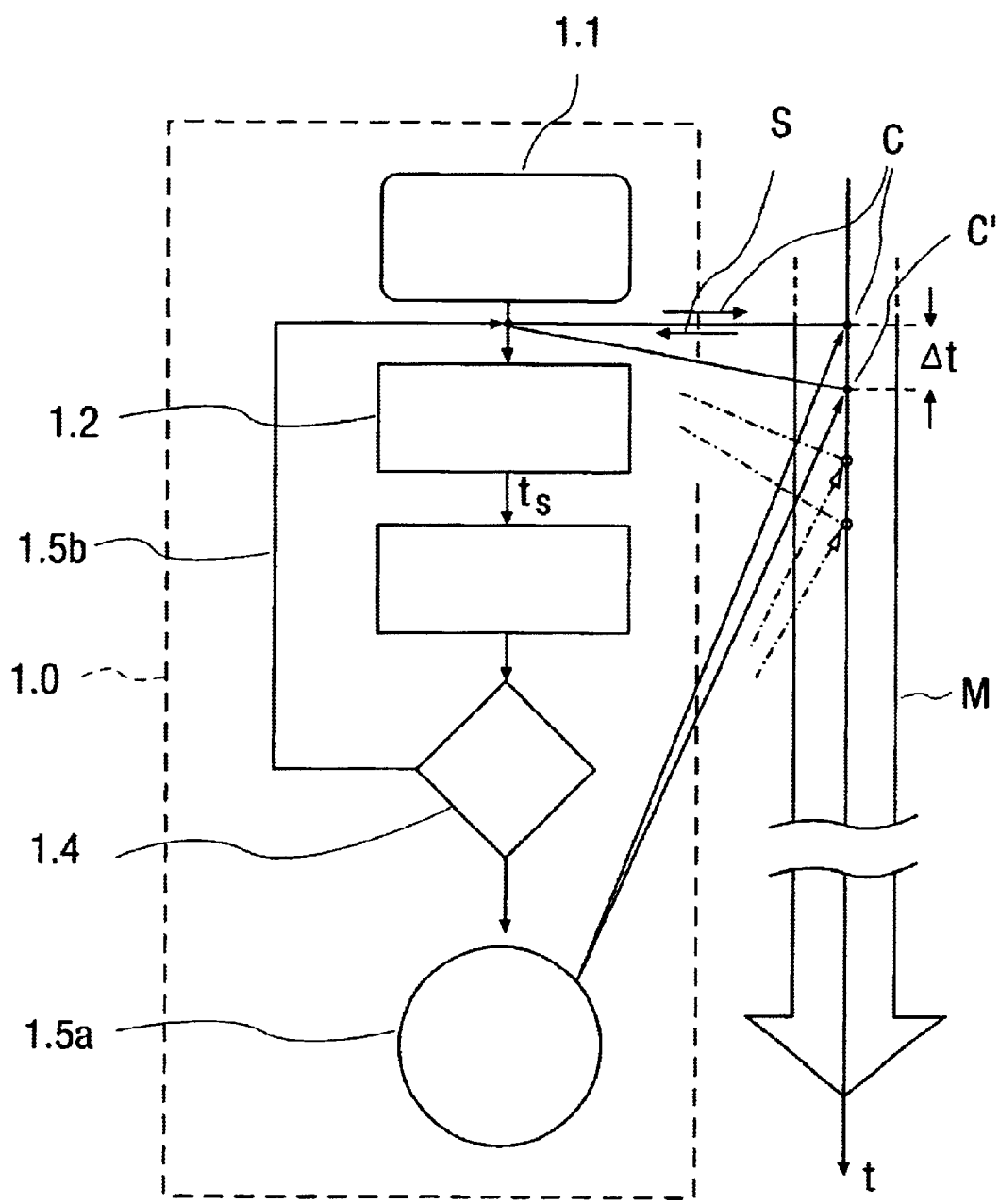
FIG. 1 is a flowchart of the collision avoidance method according to the invention.

Referring to the drawings in particular, FIG. 1 shows a robot movement M that is controlled by a known robot controller (not shown) and which is to be monitored for collision avoidance by the method according to the invention referred to as collision avoidance method 1.0. During a setup/initialization phase 1.1 potential collisions between robots, tools, and stationary objects, i.e. objects that are fixed in a workcell are determined. The work envelopes, i.e. the envelope surfaces of the work space accessible by the robots are used to deter mine whether or not there are potential collisions with other robots and/or stationary objects. After that, collision control C by the inventive method 1.0 takes place regularly at times t separated by time intervals $\Delta t$ during the robot movement M.

Figure 6:
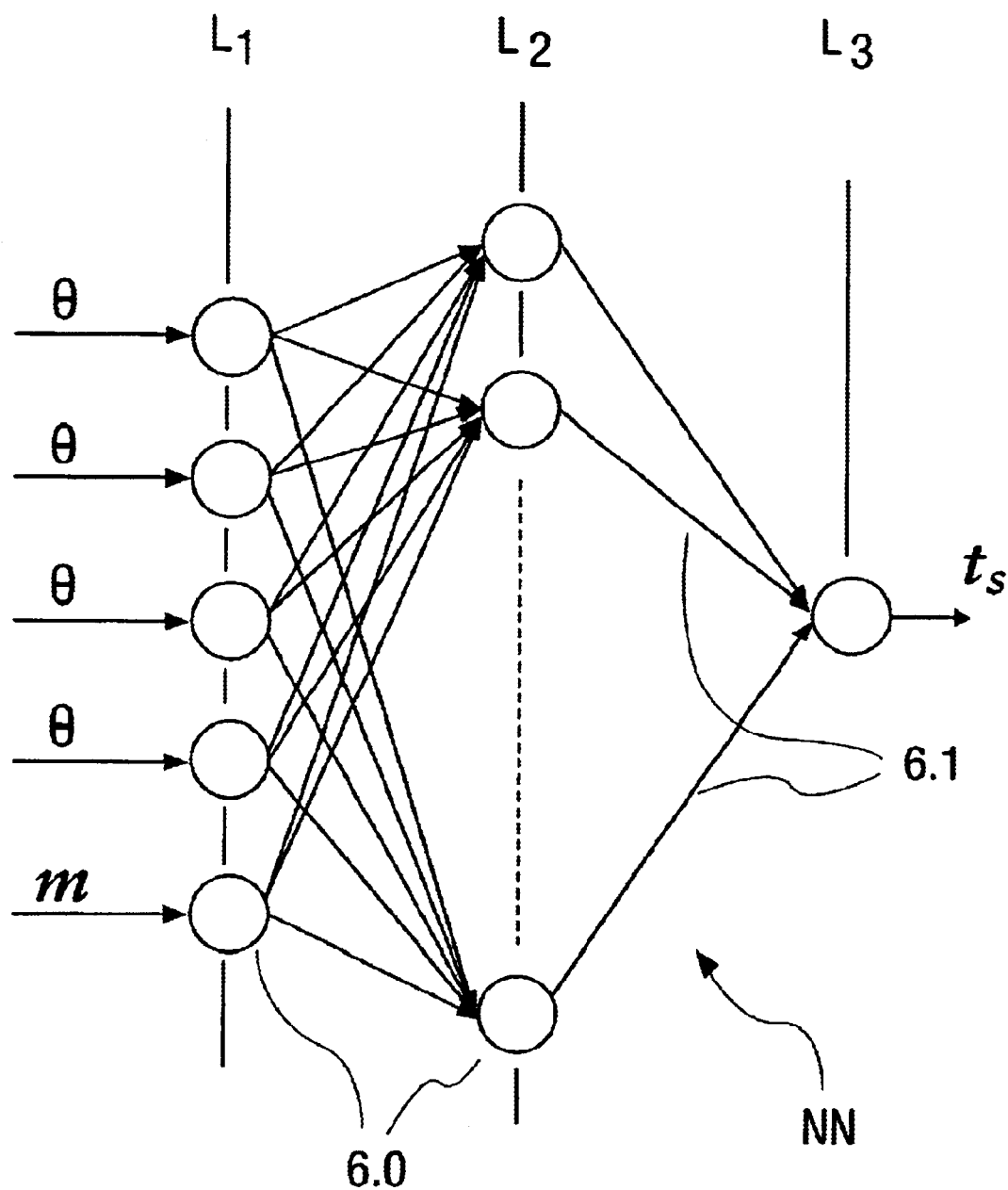
FIG. 6 is a schematic representation of a three layer neural network used for stopping time prediction in the collision avoidance method according to the invention.

Sensory data S from the robot and/or the workcell, e.g. robot joint angles and velocities, camera images, etc. are supplied to the collision avoidance method 1.0 and are used with other parameters such as payload or robot configuration for estimation of the stopping time duration is 1.2, e.g. by means of neural networks as shown in FIG. 6.

From the estimated time $t_s$ an algorithm predicts 1.3 a trajectory for the robot over the stopping time, which is then used for interference checking 1.4, which involves checking of distance between objects or components in the workcell. If a future collision is detected, the robot is stopped 1.5a. This can be done either on the robot path or off the robot path, e.g. by simple mechanical breaking. If there is no collision 1.5b, a new collision control cycle C' is started.

The collision avoidance method as described with reference to FIG. 1 is implemented by means of the control system depicted in FIG. 2, referred to as collision avoidance managers (CAM) 2.0, 2.0', which have knowledge about the other components in a workcell 2. 1, which are described in the following.

Figure 2:
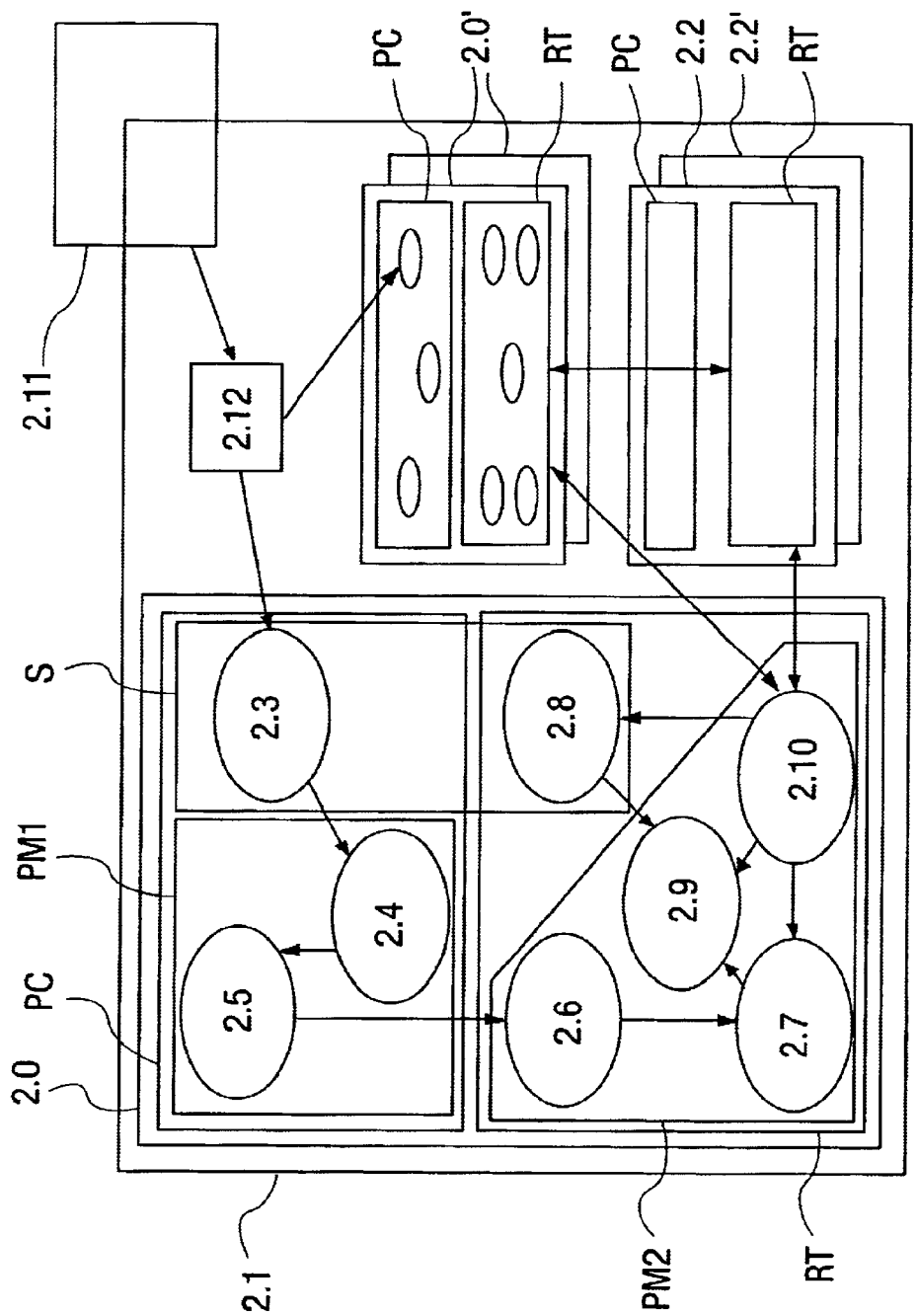
FIG. 2 is a block diagram of a robot control system for carrying out the invention.

Inside the workcell according to FIG. 2 there are several robots or cooperative mechanisms, only the known (power supply and motion) controllers 2.2, 2.2' of which are shown. The CAMS 2.0, 2.0' comprise a PC-part PC and a real time part RT defined by execution of a standard PC operating system such as Microsoft Windows™ and a real-time operating system, e.g. VxWorks™, respectively, either on one or a plurality of processor means PM1, PM2 in form of microprocessors. In the embodiment shown here, the same holds for the robot controllers 2.2, 2.2'.

The PC-parts PC of the CAMS 2.0, 2.0' comprise processor means PM1 and storage means SM (shown in an exemplary fashion) for executing and/or storing time-independent geometry files 2.3, a Workcell Diagram (WCD) 2.4 containing all in formation about collisions in the workcell 2.1 during a programmed robot movement and a specific program 2.5 codifying a robot movement. The real-time parts RT of the CAMS 2.0, 2.0' comprise processor means PM2 and storage means SM (shown in an exemplary fashion) for executing and/or storing an interpreter 2.6 for communicating dynamic part/tool changes 2.7 on the mechanism controlled by the CAMS 2.0, 2.0' to the RTs. The RTs also hold geometry data 2.8, which are used by collision avoidance task (CAT) 2.9. The CAT 2.9 receives input from a inter controller communication task 2.10 linking the RT of one CAM 2.0 to the RTs of different CAMS 2.0' and robot controllers 2.2, 2.2'. In the embodiment shown the PC and RT of CAM 2.0 share common storage means SM.

The geometry file 2.11 describing the workcell 2.1 is created either in the workcell 2.1 itself or outside the work cell by means of CAD or offline simulation. Data input 2.12 of the geometry file 2.11 to the PCs of the CAMS 2.0, 2.0' occurs via a network link or a disk drive (in the latter case by means of removable data media; not shown).

Since the robot controllers 2.2, 2.2' have the same structure as conventional controllers, a detailed explanation thereof is omitted. Details concerning a robot controller 2.2, 2.2' comprising two operating systems can be found in U.S. Pat. No. 6,356,806 B1/DE 198 57 436 A1.

All collisional information arising from the supplied geometry file 2.3 is stored in the WCD 2.4. In this context there are two kinds of potential collisions: Conditional Potential Collisions (CPC) and Unconditional Potential Collisions (U-CPC). A CPC reflects the case when the potential collision is present between two components in a work cell 2.1 only under certain circumstances. For example, a part X could potentially collide with a tool Y only if part X is handled by a first robot using tool Z and if tool Y is mounted on a second robot. In all other circumstances, part X and tool Y are so far away from each other that there is not potential of collision. A U-CPC reflects the case when the potential of collision is present at all times between the components. For example, if the work volumes, i.e. the accessible areas of two robots overlap each other at all times, then there may be an U-CPC between some links of each of the robots. A specific geometry file property in the WCD 2.4 points to the geometry approximation file to be used with the entity, i.e. the contents of the workcell 2.1. Note that a local subset of the WCD 2.4 is maintained and updated on each CAM 2.0, 2.0'. Therefore, every CAM 2.0,2.0' is aware of all the potential conditions in the workcell 2.1. When there is a change in work cell geometry, e.g. a tool change, a specific program editor (not shown) used in connection with the WCD 2.4 inserts a corresponding command in the program 2.5 that causes the interpreter 2.6 to update the dynamic tool/part information 2.7 (containing the time-dependent part of the geometry file 2.3) on the RT, which can then be accessed in real time by the CAT 2.9 responsible for actually predicting the robot movement and stopping the machines) in case of danger.

The dynamic tool/part information 2.7 contained in the RTs of the CAMS 2.0, 2.0' actually comprises pointers to the geometry data 2.8, which is also contained in the RT and accessible by the CAT 2.9 at real time for effective collision avoidance. The executing of the CAT 2.9 is also influenced by the output of the inter-controller communication task 2.10 providing a link to the RTs of other CAMS 2.0' and/or robot controllers 2.2, 2.2' present in the work cell 2.1. This happens either by direct communication or via changes to the geometry data 2.8 and/or the dynamic part/tool information 2.7 inside the RT of CAM 2.0.

Figure 3A:
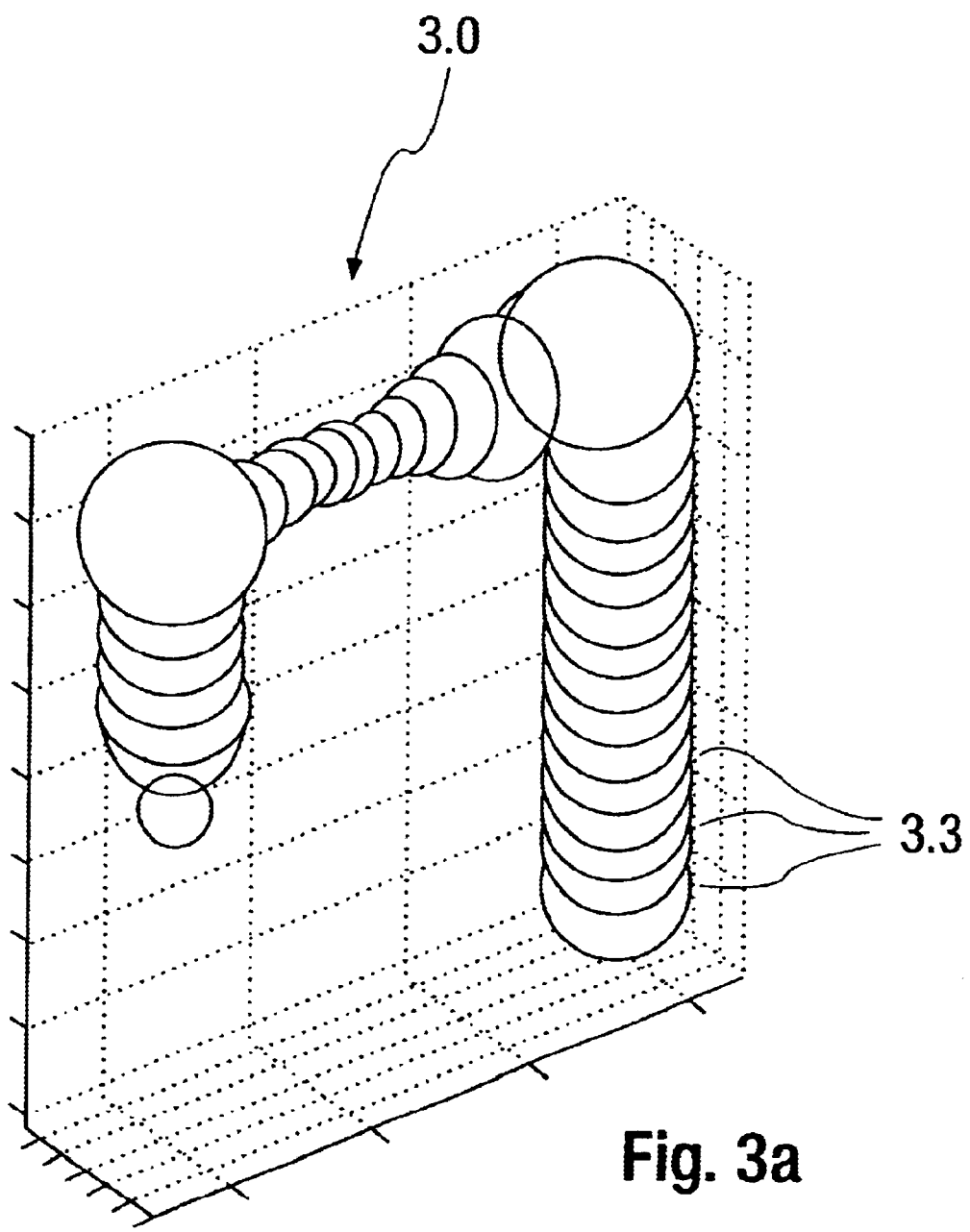
FIG. 3 are schematic diagrams showing different geometric approximations of a robot and of its components or links, receptively.
Figure 3B:
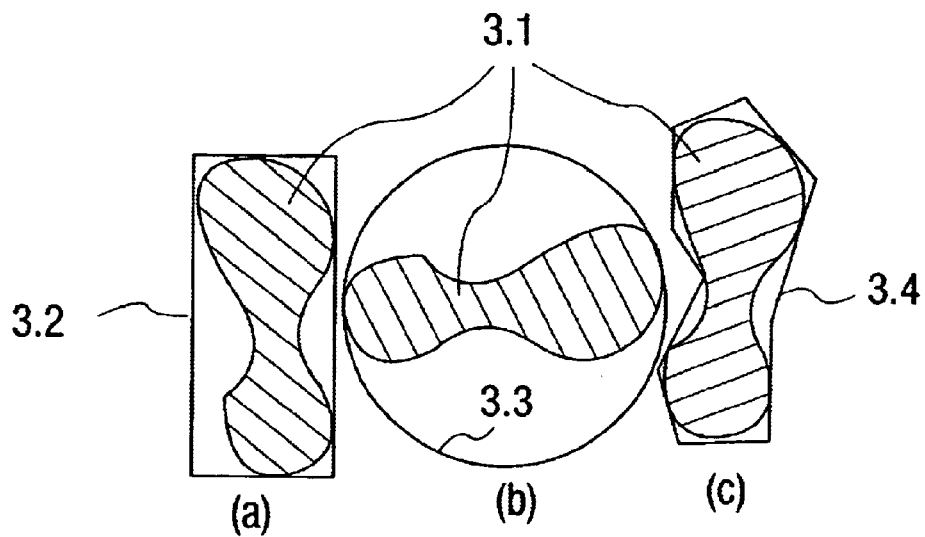

Referring now to FIG. 3 different ways of approximating links of a robot 3.0 (FIG. 3a) are displayed in a simplified schematic fashion: In FIG. 3b(a) a dumbbell-shaped robot link 3.1 is approximated by an enclosing box or cylinder 3.2, FIG. 3b (b) depicts an approximation of the same link 3.1 by a sphere 3.3. Such approximations 3.2, 3.3 are rather conservative as far as optimization of used space is concerned, but allow for a fast execution time of a collision detection algorithm due to their geometric simplicity. Approximation of links by more complex polyhedra 3.4, i.e. multi-faceted closed geometric figures leads to a higher approximation accuracy but entails reduced performance of the collision detection algorithm as far as speed of execution is concerned (FIG. 3b(c)). Therefore, the inventive method preferably uses hierarchical approximations with different levels of accuracy 3.2–3.4. If the enclosing shapes 3.2–3.4 of the links 3.1 of robots 3.0 in a workcell 2.1 are far away from each other, there is no need for the CAT 2.9 to check the more accurate approximations 3.4, which will only be checked for close encounters.

The geometric approximations 3.2–3.4 of robot links 3.1 are stored in the geometry file 2.3 and the geometric data 2.8 inside storage means SM of the CAMS 2.0, 2.0' and can thus be accessed in real time by the CAT 2.9 executing the actual collision avoidance algorithms.

Interference checking is performed by well established techniques such as the Gilbert-Johnson-Keerthi method, which is an iterative method that subdivides the geometry into simplexes until it converges to the minimum distance between the two objects, and will not be explained here.

Figure 4:
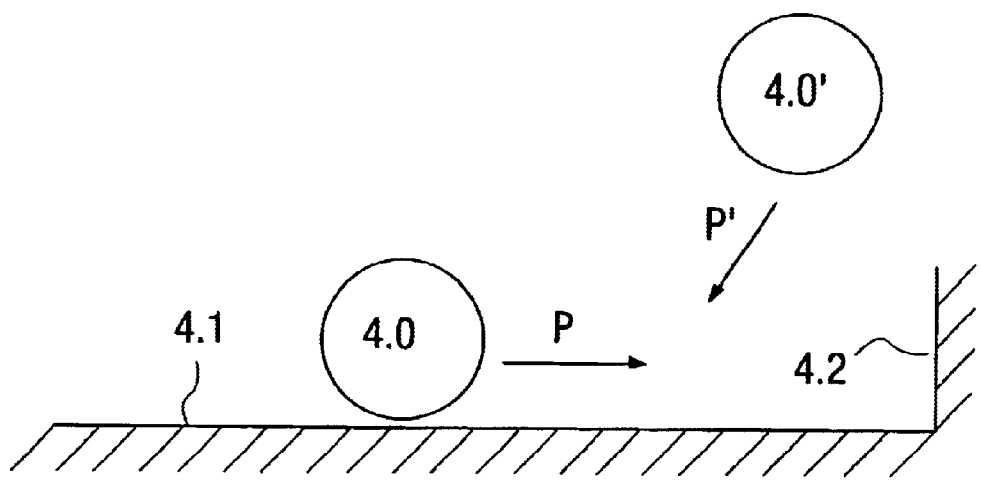
FIG. 4 is a schematic diagram showing a robot movement close to an obstacle.

In the schematic diagram according to FIG. 4 an object 4.0, e.g. a robot link is moving parallel to a horizontal surface 4.1 but towards a vertical wall 4.2. Stopping on the path P when a collision with another object 4.0' is predicted avoids a crash of objects 4.0 and 4.0'. Stopping off the path P, however, avoids the crash but could lead to a collision with the horizontal surface 4.1. Note also that predicting the collision with surface 4.1 would trigger an undesirable false alarm. Therefore, the inventive method preferably predicts and stops robot movements on the path.

In order to test the collision avoidance method according to the invention numerical simulations of movement of two identical robots 3.0 as shown in FIG. 3b in a common work cell 2.1 were performed. Each link 3.1 of the robot 3.0 was modeled as a series of spheres 3.3. The paths P, P' of each robot 3.0 were specified by a series of joint angles that were interpolated with a cubic spline. The stopping time is was assumed to be 100 ms.

Figure 5A:
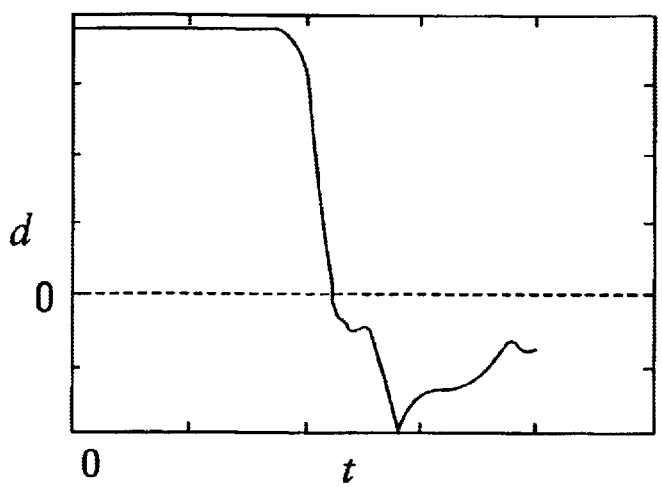
FIG. 5 shows results from a numerical simulation of collisional robot movement with two robots.
Figure 5B:
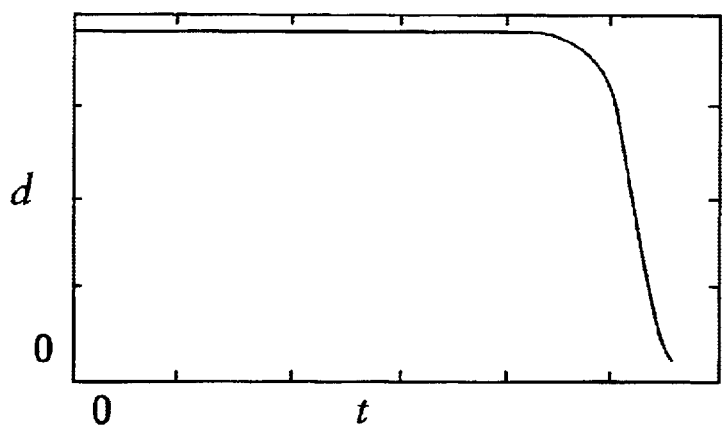
Figure 5C:
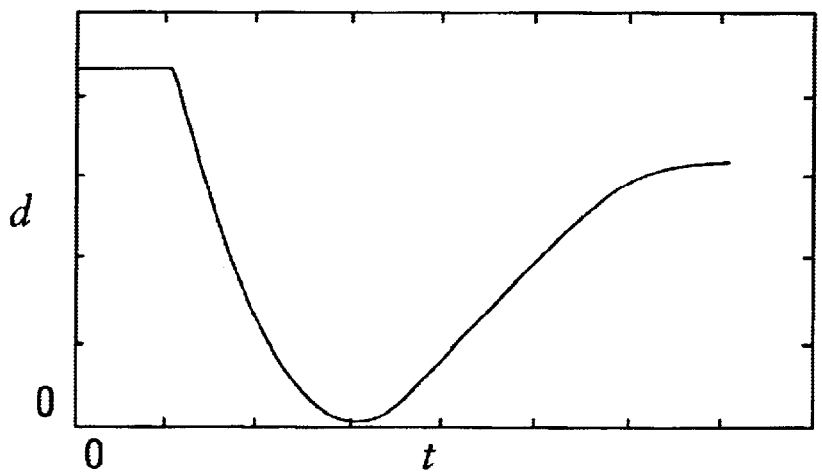

The results are shown in FIG. 5. In a first example the paths of the two robots lead to collision. The distance between the robots as a function of time t is shown in FIG. 5a. FIG. 5b shows the distance d between the robots when the collision avoidance manager is turned on. The relative movement of the robots is stopped by the CAM prior to collision (d>0 for all values for t). In another simulation the robots followed paths that lead them to come as close as 0.5 mm from each other without any collision. The goal here is to test whether there will be a "false alarm". FIG. 5c shows how the two robots come close to and then depart from each other. When the collision detection feature was turned on, no collision was predicted on the path and, therefore, the machines did not have to stop, as is desirable in practice. If the robots are made to maintain a constant distance of 0.5 mm instead of a touch-and-go scenario as described previously with respect to FIG. 5c, the results of the simulation are similar, i.e. no collision was predicted and no machine was commanded to stop.

In the simulation described with reference to FIG. 5 the stopping time was assumed to have a certain fixed value. Alternatively, the stopping time can be found from a pre-stored lookup table. However, in order to estimate the axis stopping time in a manner suitable for real-time applications the inventive proposes the use of neural networks NN for each joint of the robot to be monitored. A typical neural network for the estimation of the stopping time of an axis of a typical industrial robot is shown in FIG. 6.

A neural network NN is a computing architecture in which a plurality of elementary processors 6.0 are connected for parallel processing of information, thus forming a network. The structure of neural networks is derived from the structure of the human brain.

Neural networks are used particularly for tasks that imitate human behavior, e.g. pattern detection. They are well-known as such and shall not be described here in great detail.

The neural networks NN for the different axes of an industrial robot consist of multiple layers L1, L2, L3 of elementary processors 6.0 or nodes connected between layers by signal paths 6.1. The layers L1, L2, L3 are called input layer, intermediate layer and output layer, respectively. The nodes 6.0 on the input layer L1 take as input the parameters upon which the stopping time of an axis depends, e.g. axis speed 8 and payload mass m. This information propagates through the network NN and produces an estimation of the axis' stopping time is at the output layer L3, which is used for collision detection according to the invention.

While specific embodiments of the invention have been shown and described in detail to illustrate the application of the principles of the invention, it will be understood that the invention may be embodied otherwise without departing from such principles.

What is claimed is:

1. A method of avoiding collisions between components of a multi-axial industrial robot and at least one other object, said method comprising repeatedly:

determining a stopping time for an automatically or manually controlled robot movement of the multi-axial industrial robot on the basis of actual and past joint positions of the multi-axial industrial robot and velocities of each robot joint;

forecasting a configuration of a trajectory of the components of the multi-axial industrial robot at said stopping times;

checking the predicted configuration through distance/interference algorithms for interference of the multi-axial industrial robot components with components of the at least at least one other obiect; and stopping the robot and/or said other objects in case a collision is imminent.

2. A method according to claim 1, wherein the robot is stopped on the trajectory.

3. A method according to claim 1, wherein the robot is stopped off the trajectory.

4. A method according to claim 1 or 2 or 3, wherein interference checking involves determining distances between geometric approximations of components of the robot and the at least at least one other object.

5. A method according to claim 4, wherein said geometric approximations have different levels of accuracy which are checked according to a desired accuracy in distance checking.

6. A method according to claim 1, wherein forecasting the trajectory of a joint involves application of a relationship:

$$\theta_i = 1/2 \gamma_i t_{i,s}^2 + \dot{\theta}_{i,0} t_{i,s} + \theta_{i,0},$$

where $\theta_i$ is a predicted position of joint i, where $\theta_{i,0}$ and $\dot{\theta}_{i,0}$ are a position and a velocity of a joint i at a current time t, respectively, where $t_{i,s}$ is the stopping time of joint i, and where $\gamma_i$ is an estimated current joint acceleration.

7. A method according to claim 6, wherein a velocity of a joint i is estimated from the joint position at a current time and at earlier times using:

$$\dot{\theta}_i = c_f \cdot \sum_{k=0}^{4} c_k \cdot \theta_{i,-k},$$

where $\theta_{i,-k} = \theta_i(t_{-k})$, $t_{-k} = t - k \cdot \Delta t$, and
$c_f = 1/(12 \Delta t)$, $c_0 = 25$, $c_1 = -48$, $c_2 = 36$, $c_3 = -16$, $c_4 = 3$.

8. A method according to claim 7, wherein the acceleration of a joint i is estimated from the joint velocity at a current time and at earlier times, using:

$$\gamma_i = c_f \cdot \sum_{k=0}^{4} c_k \cdot \dot{\theta}_{i,-k}$$

9. A method according to claim 8, wherein configuration forecasting and interference checking involves:

determining a stopping distance of a joint i from $$\theta_{i,stop} = \frac{\dot{\theta}_{i,0}^2}{(2\gamma_{i,max})}$$

where $\gamma_{i,max}$, is a maximum negative acceleration of the joint;

adding the stopping distance to the actual position of the joint to obtain a configuration over the stopping time; and determining a distance between robot components and the at least one other obiect at said configuration.

10. A method according to claim 1, wherein a filter is applied to a joint position and velocity data used for position prediction.

11. A method according to claim 10, wherein said filter is applied in the time domain.

12. A method according to claim 11, wherein said filter is a running average.

13. A method according of claim 1, wherein configuration forecasting and interference checking involves using at least one neural network to estimate stopping times of the robot axes.

14. A method according to claim 13, wherein one neural network is used for each robot joint.

15. A method according to claim 14, wherein input to said neural networks includes one or more element (s) from a group comprising joint velocities, joint angles, joint positions, robot base positions, robot base velocities and tool or load masses.

16. A method according claim 1, wherein all acquired information concerning collisions is stored in a workcell description file for communication to a real-time operating system responsible for controlling the robot movement.

17. A method according to claim 16, wherein the workcell description file contains pointers to geometric approximation files needed to describe all objects present in the workcell.

18. A method according to claim 17, wherein a copy of the workcell description file is maintained and updated on each cooperative control mechanism present in the workcell.

19. A method according to claim 18, wherein the workcell description file is updated at least when a geometric change happens in the workcell.

20. A method according to claim 19, wherein the workcell description file including a description of the geometric change is updated in the real-time operating system.

21. A method according to claim 1, wherein prior to an allowed contact between the robot and an object, a link is established causing the robot not to stop during a subsequent collision.

22. A method according to claim 21, wherein the link is broken after the allowed contact operation is terminated.

23. A control device for avoiding collisions between components of a multi-axial industrial robot and at least one other object, the control device comprising:

means for repeatedly determining a stopping time for an automatically or manually controlled robot movement on the basis of actual and past joint positions and velocities of each robot joint of the multi-axial industrial robot;

means for repeatedly forecasting a configuration of a trajectory of the robot at said stopping times;

means for repeatedly checking the predicted configuration through distance/interference algorithms for interference of the robot components with components of the at least at least one other object; and means for stopping the multi-axial industrial robot and/or the at least one other object in case a collision is imminent.

24. A control device according to claim 23, comprising processor means for running two operating systems in parallel, one of which being a standard PC operating system, the other one being a real-time operating system for controlling a robot motion.

25. A control device according to claim 24, wherein said processor means in connection with the realtime operating system provides for communication with real-time operating systems of other corresponding control devices present in the same workcell.

26. A control device according to claim 25, wherein said processor means run an interpretation program for communication between the PC and the real-time operating systems.

27. A control device according to claim 24 or 25 or 26, wherein said processor means run respective parts of a program implementing a collision avoidance method.

28. A control device according to claim 24 or 25 or 26, comprising memory units in conjunction with both operating systems for storing workcell related geometry data.

29. A control device according to claim 28, further comprising an input device for inputting workcell related geometric data.

30. A control device according to claim 29, wherein the input device is a disk drive or a network connection device.

* * * * *